US012651253B2

(12) United States Patent
Verma

(10) Patent No.: US 12,651,253 B2
(45) Date of Patent: Jun. 9, 2026

(54) PRE-AUTHORIZED, ENCRYPTED AND SECURED QR CODE-BASED WALLET TO SHARE MONEY WITH AUTHORIZED RECIPIENTS

(71) Applicant: Bank of America Corporation, Charlotte, NC (US)

(72) Inventor: Sandeep Verma, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 83 days.

(21) Appl. No.: 18/415,762

(22) Filed: Jan. 18, 2024

(65) Prior Publication Data

US 2025/0238792 A1     Jul. 24, 2025

(51) Int. Cl.
  *G06Q 20/38*       (2012.01)
  *G06Q 20/32*       (2012.01)
  *G06Q 20/40*       (2012.01)
(52) U.S. Cl.
  CPC ..... *G06Q 20/3829* (2013.01); *G06Q 20/3276* (2013.01); *G06Q 20/4014* (2013.01); *G06Q 20/405* (2013.01)
(58) Field of Classification Search
  None
  See application file for complete search history.

(56) References Cited

U.S. PATENT DOCUMENTS

| | | | | |
|---|---|---|---|---|
| 7,512,665 | B1 * | 3/2009 | Cragun | ................. G06F 16/958 |
| | | | | 709/217 |
| 9,760,820 | B2 | 9/2017 | Lin et al. | |

| | | | |
|---|---|---|---|
| 9,805,296 | B2 | 10/2017 | Loy et al. |
| 10,102,465 | B2 | 10/2018 | Annamalai et al. |
| 10,296,894 | B2 | 5/2019 | Tyler et al. |
| 10,529,195 | B2 | 1/2020 | Sloo et al. |
| 10,671,902 | B2 | 6/2020 | Ophardt et al. |
| 10,698,916 | B1 * | 6/2020 | Levy ..................... G06F 16/245 |
| 10,762,406 | B2 | 9/2020 | Singh et al. |
| 10,832,110 | B2 | 11/2020 | Arce et al. |
| 11,663,578 | B2 | 5/2023 | DeSoto et al. |
| 11,850,003 | B2 | 12/2023 | Lang |

(Continued)

OTHER PUBLICATIONS

Agrawal; Inviolable e-Question paper via QR code Watermarking and Visual Cryptography; IEEE-ANTS; pp. 266-271; 2021.*

(Continued)

*Primary Examiner* — Radu Andrei
(74) *Attorney, Agent, or Firm* — Weiss & Arons LLP

(57)           ABSTRACT

Provided herein is a method of transferring an asset to a user's account, the method including the steps of: displaying a QR code in an accessible location, the code encoding a tripartite URL, including a shortened URL of a service provider, a first encrypted string whose key is housed on a server of the service provider, and a second encrypted string whose key is accessible only by authenticated user(s) and is optionally on a user profile of the user; the user scanning the code with a device; connecting the device to the server; transmitting the first encrypted string to the server; decrypting the first encrypted string; transmitting the second encrypted string to the server; obtaining authentication details from the user; decrypting the second encrypted string; connecting the device to a secure location of the server; and transferring the asset to the user's account.

11 Claims, 5 Drawing Sheets

(56) References Cited

U.S. PATENT DOCUMENTS

| 2003/0037057 | A1* | 2/2003 | Winwood | H04L 67/52 |
|---|---|---|---|---|
| 2003/0084034 | A1* | 5/2003 | Fannin | G06F 16/951 |
| 2006/0095765 | A1* | 5/2006 | Pessach | H04L 63/20 |
| | | | | 713/168 |
| 2012/0158496 | A1* | 6/2012 | Solomon | G06Q 30/0251 |
| | | | | 705/14.49 |
| 2012/0221724 | A1* | 8/2012 | Chor | G06F 16/9566 |
| | | | | 709/225 |
| 2013/0013579 | A1* | 1/2013 | Leeds | G06F 16/972 |
| | | | | 707/706 |
| 2015/0235118 | A1* | 8/2015 | Simske | G06K 7/1417 |
| | | | | 235/494 |
| 2016/0140611 | A1* | 5/2016 | Schler | G06F 16/9535 |
| | | | | 705/14.55 |
| 2016/0188743 | A1* | 6/2016 | Vaish | G06F 16/9566 |
| | | | | 707/755 |
| 2022/0215066 | A1* | 7/2022 | Sodagar | H04L 65/764 |

OTHER PUBLICATIONS

Gupta; Dynamic Changing a URL; ip.com; 4 pages; 2011.*
Jaaskelainen; Placemarks for URL Bookmarks; ip.com; 3 pages 2005.*
Kim; Design of an efficient image protection method based on QR code; ISRDETRI Korea; pp. 1448-150; 2017.*

* cited by examiner

PRE-AUTHORIZED, ENCRYPTED AND SECURED QR CODE-BASED WALLET TO SHARE MONEY WITH AUTHORIZED RECIPIENTS

FIELD OF TECHNOLOGY

Aspects of the disclosure relate to QR codes. More specific aspects relate to use of QR codes for enabling preauthorized asset transfers to authorized users and image sharing with general users.

BACKGROUND

Asset holders may have preferred recipients that wish to regularly receive asset transfers from the asset holders. The recipients may need to request manual authorization by the asset holders for each transfer, which may be onerous.

Quick response (QR) codes can be used in payment processing. Public locations are not suitable for displaying QR codes intended for a restricted set of users, for example QR codes for requesting a preauthorized asset transfer.

Photo or image galleries may be displayed in accessible areas for visitors of a home or office to view. Such galleries are not typically used for displaying QR codes, particularly QR codes intended for a restricted set of users.

SUMMARY

It is an object of this disclosure to allow and enable a quick response (QR) code-based solution for pre-authorized asset transfers that can be requested and/or activated only by authorized users.

It is a further object of this disclosure to create an apparatus for generating a customized, encrypted, and secured QR code for purposes such as pre-authorized asset transfers.

It is another object of this disclosure to create a system that enables only registered or authorized users to decrypt information encoded by QR code. In some aspects, the decrypted information may enable withdrawing or borrowing money from an asset holder's account.

It is yet another object of this disclosure to enable placement of a QR code with a restricted user set to be placed in a location accessible to others besides the authorized users. For example, a QR code that may enable withdrawing or borrowing assets from an asset holder's account may be displayed inside a family's home, without jeopardizing security of the mentioned assets.

It would be yet further desirable to create a gallery that displays both family pictures and a QR code that enables family members to request assets from a family asset pool, while simultaneously enabling non-family viewers to view family photos via the QR code but not gain access to the pooled assets.

A method in accordance with the principles of the described embodiments may be implemented by a computer and/or be automated.

A method in accordance with the principles of the described embodiments may utilize a computer processor and one or more non-transitory computer-readable media storing computer executable instructions. A system in accordance with the principles of the described embodiments may include a processor for executing computer-readable instructions. The instructions, when executed by the computer processor, may automatically scan a QR code, communicate with at least one server, decrypt a string encoded by the QR code, and/or perform various other activities, as described herein.

Provided herein is a gallery including images and a QR code, in accordance with the principles of the described embodiments. The QR code may encode a tripartite uniform resource locator (URL).

The tripartite URL of the herein-described methods and systems may include a first region. The first region may include a shortened URL of a service provider. The first region may be a shortened URL of a website of a service provider. In some embodiments of the described methods and systems, the shortened URL is a permalink.

The tripartite URL may include a second region. The second region may include a first encrypted string. The first encrypted string may be decryptable by a first key. The first key may be housed on a server associated with the mentioned service provider. The service provider of the described methods and systems may be a financial services provider. In some embodiments, the service provider is not a financial services provider.

The tripartite URL may include a third region. The third region may include a second encrypted string. The second encrypted string may be decryptable by a second key. Access to the second key may be restricted to at least one authenticated user.

In some embodiments, an unauthenticated user of the QR code may be directed to an external website displaying an image collection. The image collection may include the images in the mentioned gallery. In some embodiments, redirection to the gallery is actuated when the first key of the mentioned gallery is decrypted, and the second key is not decrypted. In some embodiments, the redirection is enabled when the first key but not the second key of the mentioned gallery is decrypted. In some embodiments, the redirection is actuated when the first key is decrypted. In some embodiments, the redirection is enabled when the first key is decrypted.

In some embodiments of the described methods and systems, the mentioned server may include a profile of an asset owner's account. In some embodiments, an authenticated user of the QR code may be directed to the profile. In some embodiments, a user is directed to the profile upon providing authentication details.

In some embodiments, the server may include an asset transfer functionality. In some embodiments, the functionality is activated when the first and second encrypted strings are decrypted. In some embodiments, the functionality is enabled when the first and second encrypted strings are decrypted.

In some embodiments of the described methods and systems, the mentioned server may be configured to receive a connection request from a device in possession of an authenticated QR code user. In some embodiments, the device may be configured to connect to the server. The server may be configured to receive a request to transfer an asset from an account belonging to the owner of the asset to an account belonging to the authorized user. In some embodiments, decrypting the second encrypted string enables this request to be sent to the server. In some embodiments, the transfer request may be made by the mentioned device in possession of the user.

In some embodiments of the described methods and systems, the server may be configured to enable the owner to impose one or more pre-set limits or limitations on the asset transfer. In some embodiments, the limitation may include a maximum asset amount per transfer. In some embodiments, the limitation may include a maximum asset amount per day. In some embodiments, the limitation includes a maximum asset amount per week or, in another embodiment, a maximum asset amount per month. In some embodiments, the limitation may include a maximum number of transfers per week or per month. In some embodiments, the limitation may stipulate a minimum time interval between transfers.

In some embodiments of the described methods and systems, the server may be configured to preauthorize future transfers. In some embodiments, the server may be configured to provide the asset account owner with an option to require preauthorization to effect the mentioned transfer. In some embodiments, the server may query the owner whether to require preauthorization. In some embodiments, the server may not be configured to provide such an option to the owner.

In some embodiments of the described methods and systems, the mentioned server may be configured to connect to a device in possession of the authenticated user. In some embodiments, the device may be configured to connect to the server. In some embodiments, the server may enable a request to transfer an asset from an owner account, in other words, an account belonging to an owner. In some embodiments, the account may house the asset. In some embodiments, the request may require decrypting the first and second strings. In some embodiments, the transfer request may originate from the mentioned device.

In some embodiments of the described methods and systems, the mentioned images and QR code may be displayed as physical images. In some embodiments, the QR code may be printed and placed on a gallery wall or other accessible location.

In some embodiments of the described methods and systems, the images and QR code may be displayed as virtual images. In some embodiments, a virtual copy of the QR code is shared with the authorized users. In some embodiments, a virtual copy of the QR code may be shared on a virtual image gallery.

In some embodiments of the described methods and systems, the first encrypted string may include a customer identifier. In some embodiments, decryption of the string may reveal the customer identifier. In some embodiments, the first string may include a QR code identifier. In some embodiments, decryption of the string may reveal the QR code identifier.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
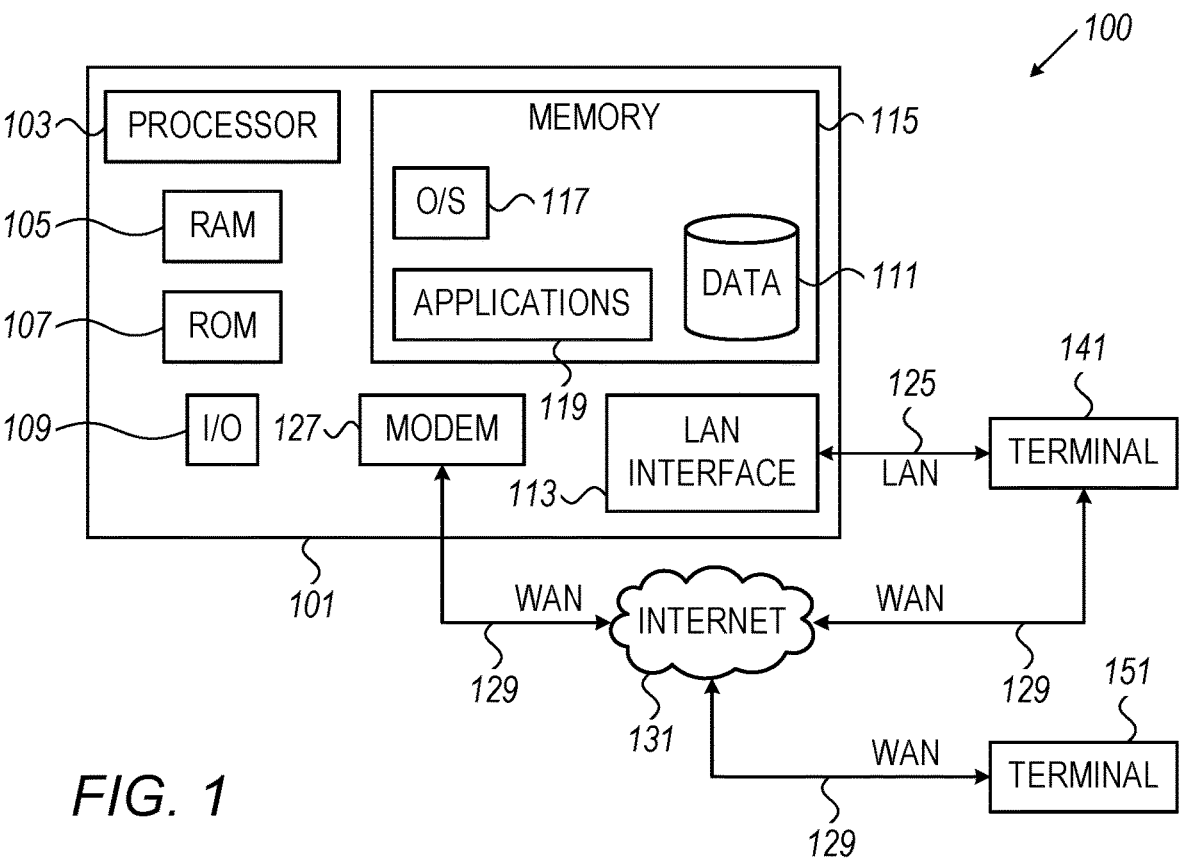
FIG. 1 shows an illustrative system in accordance with the principles of the described embodiments.

A method in accordance with the principles of the described embodiments may facilitate repeated asset transfers from an asset holder to an authorized recipient.

Embodiments of the system, as described herein, leverage QR codes, encrypted strings, and/or other complex, specific-use computer systems to provide a novel approach for facilitating asset transfers and prevent inadvertent transfers to unauthorized users. The system utilizes processors, which may include machine learning models, to decode and decrypt QR codes and connect to servers and keys stored thereon.

A method in accordance with the principles of the described embodiments may be implemented by a computer and/or be automated.

Provided herein is a gallery including images and a QR code, in accordance with the principles of the described embodiments. The QR code may encode a tripartite URL. In some embodiments, the URL may have any of the characteristics described herein, non-limiting examples of which are a first region, which may include a shortened URL of a service provider; a second region, which may include a first encrypted string, which string may be decryptable by a first key; and a third region, which may include a second encrypted string, which string may be decryptable by a second key. In some embodiments, the gallery is in the form of a collage.

In some embodiments, an unauthenticated user of the QR code may be directed to an external website displaying an image collection. The image collection may include the images in the mentioned gallery.

In some embodiments, the mentioned server may include a subdomain of an asset owner's account. In some embodiments, an authenticated user of the QR code may be directed to the subdomain. In some embodiments, this direction is actuated when the first and second encrypted strings are decrypted. In some embodiments, redirection to the subdomain is enabled when the first and second encrypted strings are decrypted.

In some embodiments, the mentioned server may be configured to receive a connect request from a device in possession of an authenticated QR code user. In some embodiments, the device may be configured to connect to the server. The server may be configured to receive a request to transfer an asset from an account belonging to the owner of the asset to an account belonging to the authorized user. In some embodiments, decrypting the second encrypted string enables this request to be sent to the server.

In some embodiments, the server may be configured to enable the owner to impose one or more pre-set limits or limitations on the asset transfer.

In some embodiments, the mentioned server may be configured to connect to a device in possession of the authenticated user. In some embodiments, the device may be configured to connect to the server. In some embodiments, the server may enable a request to transfer an asset from an account owner. In some embodiments, the account may house the asset. In some embodiments, the request may require decrypting the first and second strings.

In some embodiments, the mentioned images and QR code may be displayed as physical images.

In some embodiments, the images and QR code may be displayed as virtual images.

In some embodiments, the first encrypted string may include a customer identifier. In some embodiments, decryption of the string may reveal the customer identifier. In some embodiments, the first string may include a QR code identifier. In some embodiments, decryption of the string may reveal the QR code identifier.

In some embodiments, there is provided herein a method of transferring an asset from a first user's account to a second user's account, in accordance with the principles of the described embodiments. In some embodiments, there is provided a method of providing an asset to the second user's account. In some embodiments, the user accounts serve to document possession or storage of units of the asset.

In some embodiments, the method may include the step of displaying a QR code in a location accessible to the second user. In some embodiments, the code may encode a tripartite URL. In some embodiments, the URL may have any of the characteristics described herein. In some embodiments of the described methods and systems, the QR code may be placed in a public location.

The tripartite URL may include a first region. The first region may include a shortened URL of a service provider.

The tripartite URL may include a second region. The second region may include a first encrypted string. The first encrypted string may be decryptable by a first key. The first key may be housed on a server associated with the mentioned service provider. In some embodiments, the first key is a symmetric key. In some embodiments, the first key is an asymmetric key. In some embodiments, the first key is a decryption key. In some embodiments, the first key is a cryptographic key.

The tripartite URL may include a third region. The third region may include a second encrypted string. The second encrypted string may be decryptable by a second key. Access to the second key may be restricted to at least one authenticated user. In some embodiments, the second key is housed on a user profile of the second user. In some embodiments, the second key is a symmetric key. In some embodiments, the second key is an asymmetric key. In some embodiments, the second key is a decryption key. In some embodiments, the second key is a cryptographic key.

The described method may include the step of scanning the QR code by a device. The device may belong to, or be in possession of, the second user. The second user may desire to receive an asset from the first user.

The described method may include the step of connecting the device to a server. The server may belong to, be operated by, or be associated with a service provider. The method may include the step of connecting the device to a website of the service provider.

The method may include the step of transmitting the first encrypted string to the server.

The described method may include the step of decrypting the first encrypted string. This string may be encrypted using a key. The method may utilize a key stored on a server to decrypt the first string. This key may be referred to herein as the "first key". This key may be housed on the mentioned server. The key may be accessible without restriction to users that connect to the server. The key may be accessible to all holders of an account with the service provider.

The described method may include the step of transmitting the second encrypted string to the server.

The method may include the step of obtaining authentication details from the second user. The method may include requiring the second user to provide authentication details.

The described method may include the step of decrypting the second encrypted string. This string may be encrypted using a second key. This key may be housed on a user profile of the second user. This key may be stored on a user profile of the second user. This key may be stored or housed on the mentioned server, with an access requirement of authenticating as an authorized user. These authorized users may be authorized recipients of the mentioned asset. The second key may be stored on a location of the server that is only accessible to authenticated users.

The method may include the step of connecting the device to a secure location of the server. The method may include redirecting the device to a secure location of the server. This secure location may be separate from the location that stores the mentioned second key. This secure location may be configured to support an asset transfer request. The method may include accessing a functionality of the server. This secure server location may have access to the first user's account.

Reference herein to a "secure" location or region of a server may indicate that the location or region is not freely accessible to other entities that connect with the server. In some embodiments, the term denotes a location or region that requires supplying login details of an authorized user before access is granted.

The connection or redirection may require providing the mentioned authentication details. The connection may be actuated by providing the authentication details. The connection or redirection may require decrypting the second encrypted string. The connection may be actuated by decrypting the second encrypted string. As mentioned, decrypting the second encrypted string may require access to the mentioned second key. In some embodiments of the described systems and methods, connection to the secure location is only possible when using a registered device.

The described method may include the step of transferring the asset from the first user's account to the second user's account. The mentioned functionality or secure location of the server may perform the transferring step. The secure server location may receive the transfer instructions from the mentioned device. In some embodiments, the method may include the step of requesting permission, or authorization, from the first user to transfer the asset. The mentioned secure location may enable the second user to request the first user's permission or authorization to transfer the asset.

In some embodiments of the described method, access of the second user to the second decryption key may require permission or authorization of the first user on a per-use basis. In some embodiments, permission or authorization is not required on a per-use basis.

In some embodiments of the method, the QR code may be displayed in a gallery. In some embodiments, the gallery is a physical gallery. In some embodiments, the gallery is a virtual gallery. In some embodiments, the gallery is in the form of a collage.

In some embodiments, there is provided herein a method of configuring future transfers of an asset from a first user's account to a second user's account, in accordance with the principles of the described embodiments.

The method may include the step of authenticating the first user on a server. The server may house, or be associated with, the first and second users' accounts. In some embodiments, the server belongs to a service provider. The first and second users may both have accounts with the service provider. In some embodiments, the accounts serve to document possession or storage of the mentioned asset.

The described method may include the step of generating a QR code. In some embodiments, the QR code may be generated by the mentioned server. In some embodiments of the described methods and systems, the QR code may be associated with an asset account. In some embodiments, the account holder wishes to preauthorize future transfers from the account.

The method may include the step of configuring one or more permission settings. The setting(s) may be associated with the QR code. The setting(s) may be associated with the first user account. The setting(s) may regard future transfers of the mentioned asset.

In some embodiments, the mentioned permission setting includes a maximum frequency. In some embodiments, the frequency is a transfer frequency limit. In some embodiments, the limit is a maximum number of transfers per day. The limit may be a maximum number of transfers per week. The limit may be a maximum number of transfers per biweekly period. The limit may be a maximum number of transfers per month. In some embodiments, the limit may stipulate a minimum time interval between transfers.

In some embodiments, the permission setting includes a maximum amount per transfer. In some embodiments, the setting is a maximum transfer amount per day. The setting may be a maximum transfer amount per week. The setting may be a maximum transfer amount per biweekly period. The setting may be a maximum amount per month.

In some embodiments, the permission setting includes a preauthorization requirement. In some embodiments, the mentioned server may request the first user to stipulate whether or not to require preauthorization before each asset transfer to the second user. The first user may be given the option to require preauthorization before each transfer to the second user. The first user may be given the option to waive a preauthorization requirement for any transfer that meets certain requirements, for example a maximum amount. In some embodiments, preauthorization may be required only when the second user requests a transfer that exceeds a preapproved limit, for example a limit mentioned herein.

The described method may include the step of displaying the QR code. The code may be displayed in a location accessible to the second user. In some embodiments, the location is accessible only to the second user. In some embodiments, the location is accessible to other authorized users besides the second user. In some embodiments, the location is accessible to other individuals besides the second user. In some embodiments, the location is accessible to individuals that are not authorized users. In some embodiments, the location is a physical location. In some embodiments, the location is a virtual location.

In some embodiments, the mentioned QR code may encode a tripartite URL. In some embodiments, the URL may have any of the characteristics described herein.

The tripartite URL may include a first region. The first region may include a shortened URL of a service provider.

The tripartite URL may include a second region. The second region may include a first encrypted string. The first encrypted string may be decryptable by a first key. The first key may be housed on a server associated with the mentioned service provider.

The tripartite URL may include a third region. The third region may include a second encrypted string. The second encrypted string may be decryptable by a second key. Access to the second key may be restricted to at least one authenticated user.

In some embodiments of the described method, each access of the second user to the second key may require permission of the first user. In some embodiments, the first user grants general access of the second user to the second decryption key, such that per-use permission of the first user is not required.

In some embodiments, there is provided herein a method of transferring an asset from a first user's account to a second user's account, in accordance with the principles of the described embodiments.

The method may include the step of performing the aforementioned method and/or method steps, e.g., (i) authenticating the first user on a server associated with the first and second users' accounts; (ii) generating a QR code; (iii) configuring a permission setting associated with the QR code; and/or (iv) displaying the QR code in a location accessible to the second user. In some embodiments, some or all of the aforementioned steps may be as described hereinabove. In some embodiments, the method may further include any of the below-mentioned steps.

The method may include scanning the code by a device. The device may be in possession of the second user. The device may belong to the second user.

The described method may include the step of connecting the device to a server of a service provider. The method may further include connecting the mentioned device to a website. The website may belong to a service provider. The first and second user may have accounts with the service provider.

The described method may include transmitting the first encrypted string to the server. The described method may further include decrypting the first encrypted string with the first key. The first key may be stored on the server.

The described method may include transmitting the second encrypted string to the server.

The described method may include requiring the second user to provide authentication details.

The described method may include decrypting the second encrypted string with the second key. The second key may be stored on the server. The second key may be stored on a user profile. The user profile may be a profile on the mentioned server.

The described method may include redirecting the device to a secure location of the server, upon provision of the authentication details. The secure location may be configured to receive an asset transfer request. The secure location may be configured to perform an asset transfer. The method may include enabling a functionality of the server, upon provision of the authentication details. The functionality may include transfer of an asset.

The described method may include the step of requesting permission from the first user before transferring the asset. In some embodiments, such permission may be required on a per-transfer basis only when the first user has elected to require preauthorization before each asset transfer.

The described method may include transferring the asset from the first user's account to the second user's account.

There is also provided herein a digital wallet that is accessible via a QR code, in accordance with the principles of the described embodiments. The QR code may have any of the aforementioned characteristics.

QR code 330, QR code 612, and QR code 712 may have one or more features in common with the QR codes described herein. Additionally, features of QR codes described in connection with FIGS. 3, 6 and 7 may be included in the QR codes described herein.

The aforementioned processing device or computer processor may be a computer, as described in more detail in FIG. 1, optionally including any of the components and elements described for FIG. 1.

Figure 2:
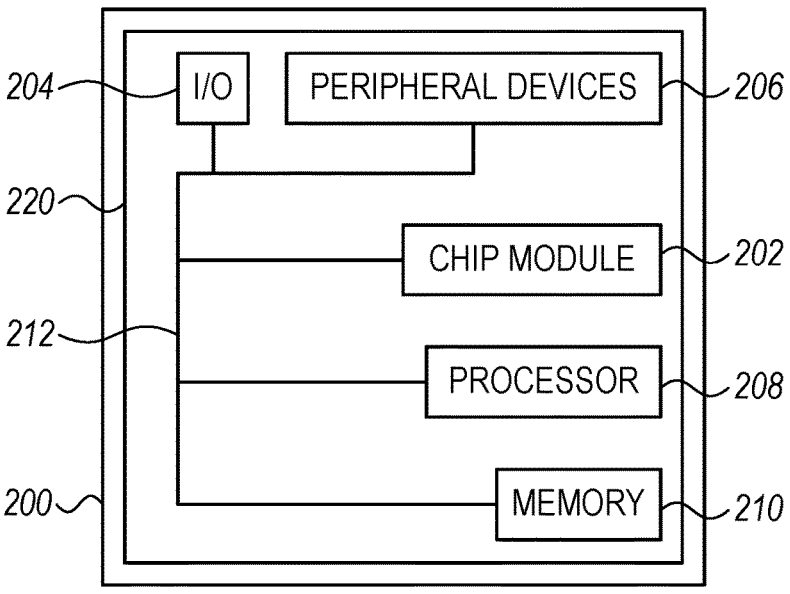
FIG. 2 shows a diagram of an illustrative system in accordance with the principles of the described embodiments.

In some aspects, the processing device or computer processor may be a computer, as described in more detail in FIG. 2, optionally including any of the components and elements described for FIG. 2.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

One or more of the described systems may comprise one or more computer systems and servers that include one or more of the following hardware components: Computer 101 may have a processor 103 for controlling the operation of the device and its associated components, and may include random-access memory (RAM) 105, read-only memory (ROM) 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative, and other means of establishing a communications link between computers may be used. The existence of various well-known protocols such as TCP/IP, Ethernet, FTP, HTTP, and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may scan a QR code, decode and/or decrypt various components of the code, and direct a user of a device that scanned the code to various server locations. The computer executable instructions may be embodied in hardware or firmware (not shown). The computer 101 may execute the instructions embodied by the application program(s) 119 to perform various functions, such as generating a QR code, receiving and implementing instructions to decrypt the code, and directing a device to different server locations, depending on whether part or all of the code has been successfully decrypted.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. Such programs may be considered engines for the purposes of this application and with respect to the performance of the particular tasks to which the programs are assigned, for example generating and/or scanning a QR code, configure permissions associated with the code, and receiving and implementing instructions to transfer an asset and/or view an image gallery.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

FIG. 2 shows illustrative apparatus 200 that may be configured in accordance with the principles of the described embodiments. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figures 3, 4:
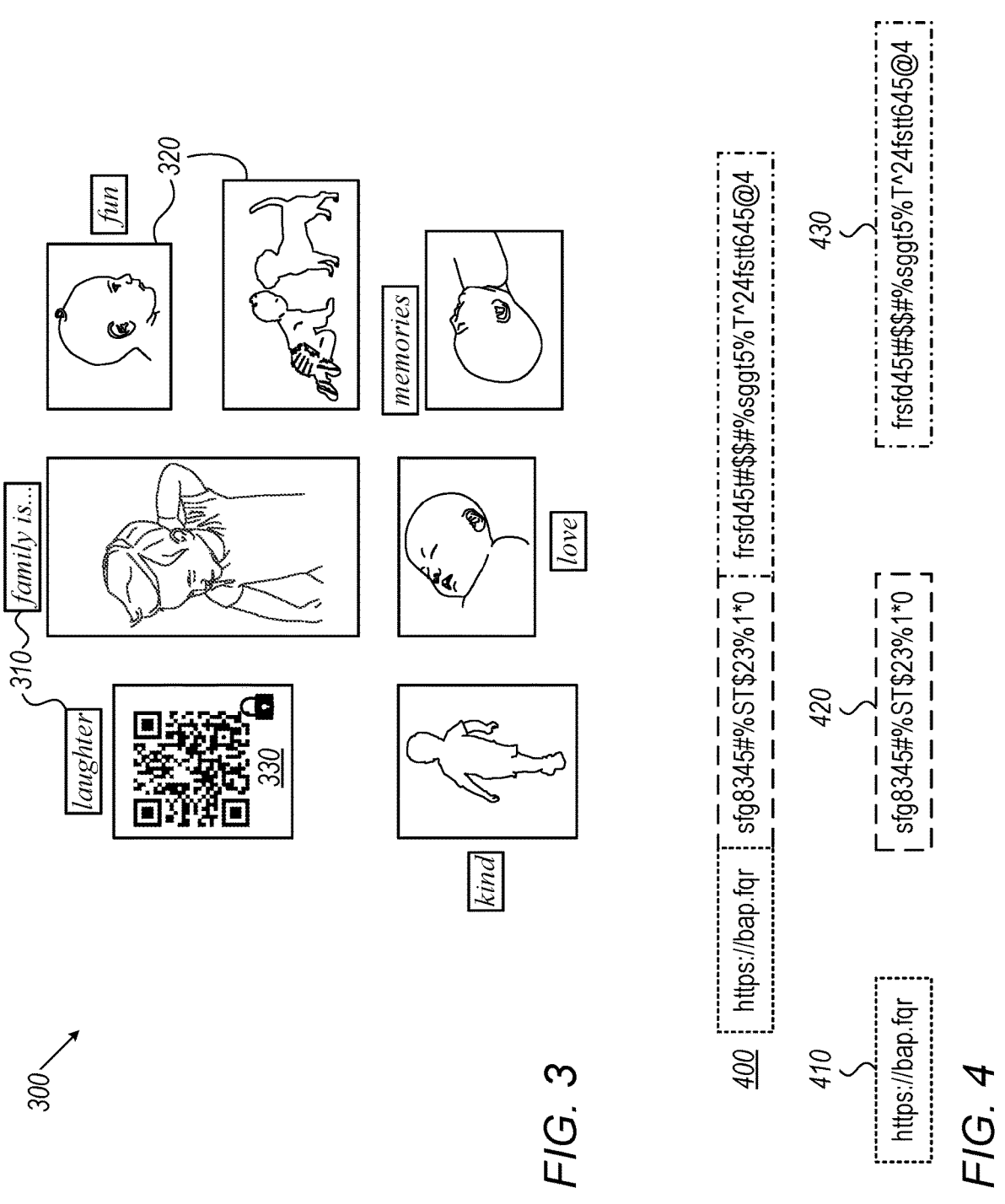
FIG. 3 shows a diagram of a gallery in accordance with the principles of the described embodiments.
FIG. 4 shows a diagram of a tripartite URL in accordance with the principles of the described embodiments.

FIG. 3 shows gallery 300, which may be optionally placed on an interior wall of a home, in accordance with the principles of the described embodiments. Gallery 300 may include descriptive text 310, photos 320, and QR code 330.

FIG. 4 shows a non-limiting example of a tripartite URL 400, in accordance with the principles of the described embodiments. Tripartite URL 400 may include first region 410, which may be a short URL to a domain with the desired functionality. Tripartite URL 400 may include second region 420, which may be an encrypted string. The encrypted string may be decryptable only by a server of a desired service provider. The encrypted string may encode a decrypted text. The decrypted text may include a customer identifier and a QR code identifier (not depicted).

With further reference to FIG. 4, tripartite URL 400 may include third region 430, which may be a second encrypted string. The second encrypted string may be decryptable only by the mentioned server. The key for decrypting the second encrypted string may be stored in a secure location on the server.

Figure 5:
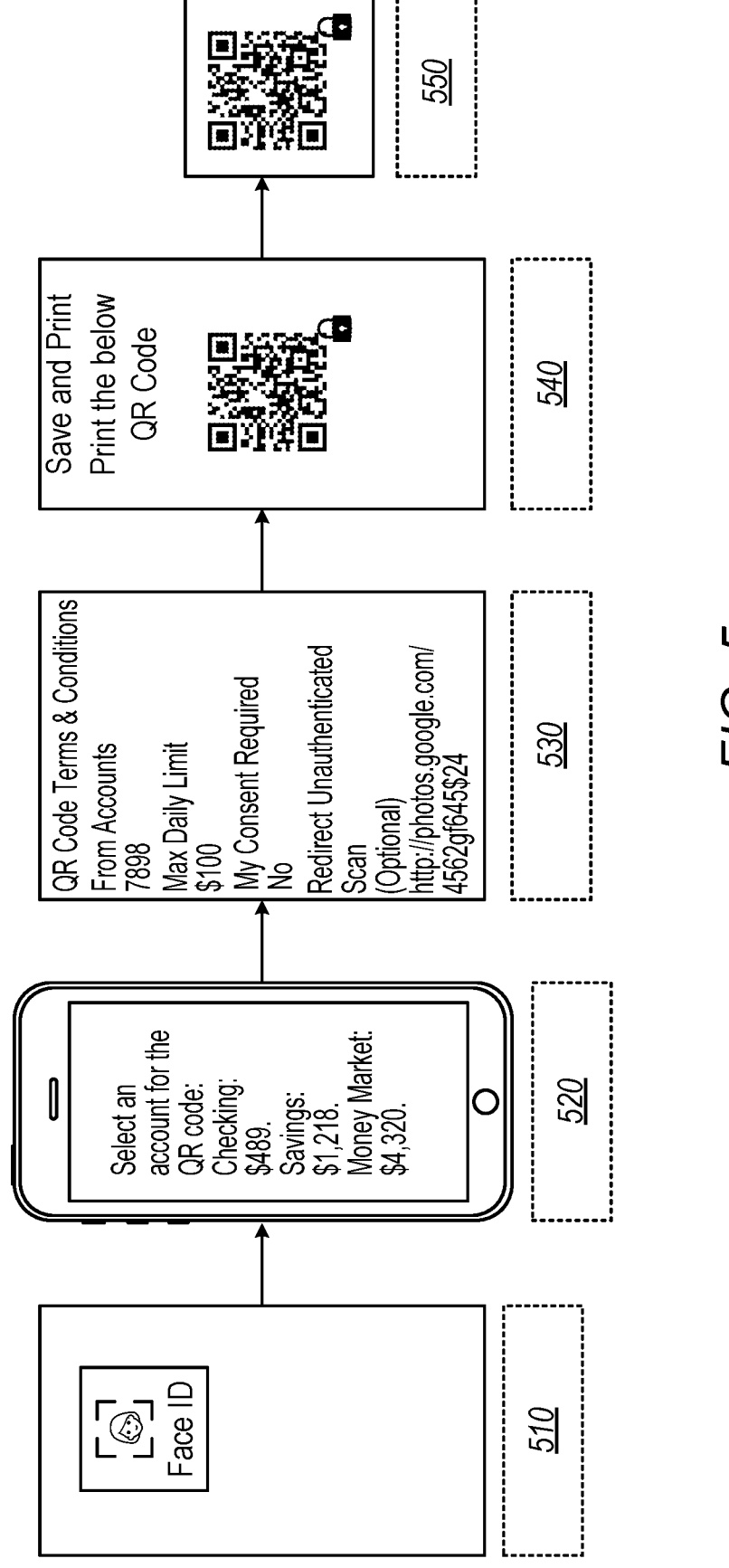
FIG. 5 shows a method in accordance with the principles of the described embodiments.

FIG. 5 is a process diagram showing steps of an exemplary method 500, in accordance with the principles of the described embodiments. At step 510, a first user or account holder logs into her account. At step 520 (optional), a first account holder selects an account that will be associated with a QR code. At step 530, first account holder configures conditions of QR code-based wallet use and optionally also elects to redirect scans by unauthorized users to the family virtual photo album. At step 540, a processor generates the requested QR code in association with the elected preferences. At step 550 (optional), first account holder prints the QR code and displays it on a family gallery wall.

Figure 6:
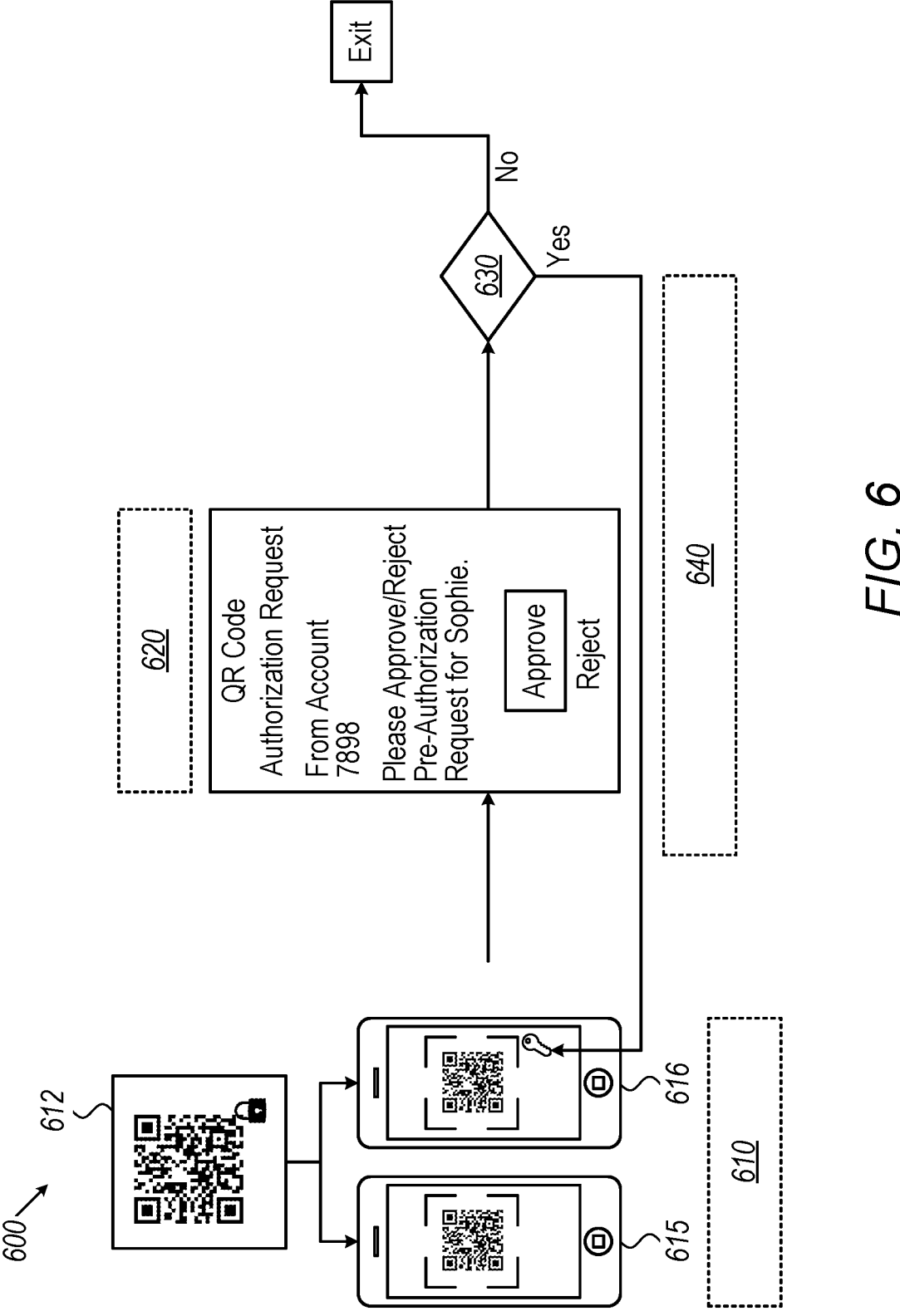
FIG. 6 shows a method in accordance with the principles of the described embodiments.

FIG. 6 is a process diagram showing steps of an exemplary method 600, in accordance with the principles of the described embodiments. At step 610, the QR code 612, which may be displayed in an accessible location to users, is scanned by first device 615 and second device 616, belonging to or in possession of one or more users or account holders, which may be referred to as the "second" and "third" users or account holders, and second and third users or account holders request an asset transfer. Second and third users or account holders may be optionally two children of the first account holder (see description of FIG. 5). Step 610 may include the first device 615 and second device 616 automatically opening an application or program of a service provider and being asked to provide login details.

With further reference to FIG. 6, at step 620, first account holder approves or rejects the request. At step 630, a processor determines whether the request(s) were approved by the first account holder. If not, the transfer process terminates. If yes, at step 640, the processor installs a decryption key on each of first device 615 and second device 616, or the banking profiles of each of second and third account holders. Decryption keys may be used to decrypt the second encrypted string (see description of FIG. 4).

Figure 7:
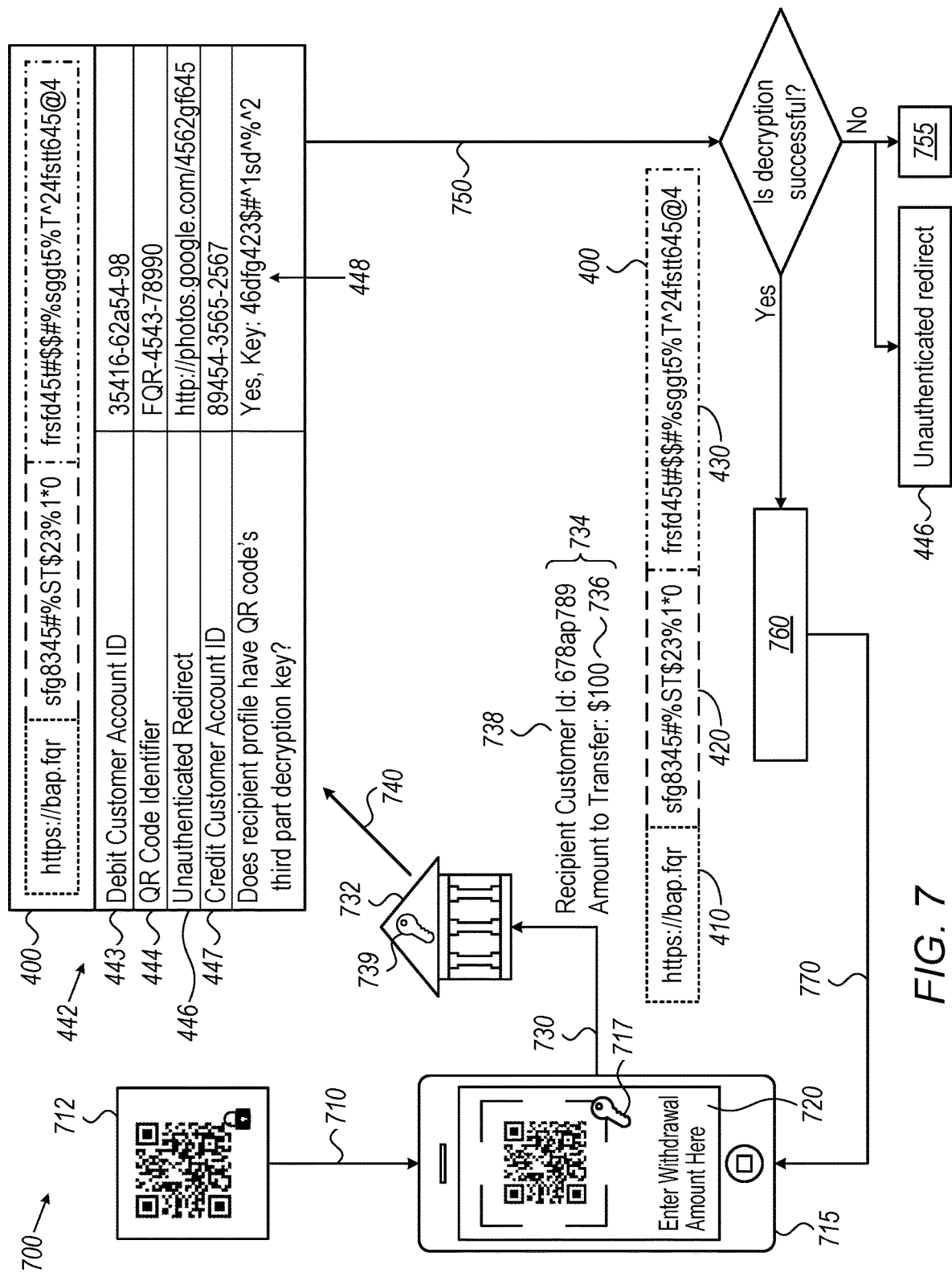
FIG. 7 shows a method in accordance with the principles of the described embodiments.

FIG. 7 is a process diagram showing additional exemplary method steps 700, in accordance with the principles of the described embodiments. Method steps 700 may follow login of the authorized user through her account details. At step 710, QR code 712 is scanned by a device 715 belonging to an authorized user. The authorized user's profile may contain a private ("second") decryption key 717 to decrypt the second encrypted string. At step 720, device 715 prompts authorized user to enter a requested withdrawal or transfer amount. At step 730, device 715 (optionally via an application or program of a service provider) transfers an information packet 734 to server 732 of the service provider. Information packet 734 may include tripartite URL 400, the amount requested 736, and/or the customer identifier or identification number 738 of the requestor. At step 740, server 732 may decrypt first and second regions of tripartite URL 400 using a first decryption key 739 stored on server 732. Decryption of first and second regions 410, 420 of tripartite URL 400 may extract a partial payment instruction 442. Partial payment instruction 442 may include payor customer identifier 443, QR code identifier 444, an optional unauthenticated user redirect URL 446, recipient customer identifier 447, and/or and an indication 448 of whether the recipient customer profile has the second decryption key.

With further reference to FIG. 7, at step 750, the server may decrypt the third region 430 of tripartite URL 400 using second key 717, which may be stored on the recipient customer's profile. At step 755, if decryption is unsuccessful, transfer process is terminated and, optionally, device is redirected to unauthenticated user URL 446. At step 760, if authorization and decryption of the entire tripartite URL are successful, the decryption may extract a complete payment instruction. Payment instruction may include the amount requested, payor customer identifier, QR code identifier, an optional unauthenticated user redirect URL, recipient customer identifier, and information encoded in the third region of the tripartite URL, e.g., following decryption of third region 430.

With further reference to FIG. 7, At step 770, assets are transferred to authorized user's account, and a notification of the asset transfer is displayed on device 715.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, described embodiments may take the form of an entirely software embodiment (including firmware, resident software, micro-code, and the like), an entirely hardware embodiment, or an embodiment combining software and hardware aspects that may generally be referred to herein as a "system." Furthermore, described embodiments may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented, the computer device and application-specific circuits associated therewith are deemed specialized computer devices capable of improving technology associated with intelligently controlling data transfers between network connected devices and a platform layer application server.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random-access memory (RAM), a read-only memory (ROM), an erasable programmable read-only memory (EPROM or Flash memory), a compact disc read-only memory (CD-ROM), and/or some other tangible optical and/or magnetic storage device. In other described embodiments, however, the computer-readable medium may be transitory, such as a propagation signal including computer-executable program code portions embodied therein.

It will also be understood that one or more computer-executable program code portions may be required on a specialized computer for carrying out the specialized operations, including object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of described embodiments are written in conventional procedural programming languages, such as the "C" programming languages and/or similar programming languages. The computer program code may alternatively or additionally be written in one or more multi-paradigm programming languages, such as, for example, F #.

It will further be understood that some embodiments are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for intelligently controlling data transfers between network connected devices and a platform layer application server, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out described embodiments.

In some aspects of the described methods and systems, a regulated machine learning (ML) model is utilized. The regulated ML model and the ML engine may consider input data patterns, output data patterns, thresholds for model performance, and/or distributions of identified patterns between different ML models.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, apparatus, and computer program products for QR-code based wallets and systems are provided. Persons skilled in the art will appreciate that the present invention can be practiced by other than the described embodiments, which are presented for purposes of illustration rather than of limitation.

What is claimed is:

1. A gallery comprising images and a QR code, wherein the QR code encodes a tripartite uniform resource locator (URL), the tripartite URL comprising:
    a first region comprising a shortened URL of a service provider;

a second region comprising a first encrypted string, the first encrypted string decryptable by a first key housed on a server associated with the service provider; and
a third region comprising a second encrypted string, the second encrypted string decryptable by a second key restricted to at least one authenticated user,
wherein, when the first string is decrypted, and the second string is not decrypted, an unauthenticated user is connected to an external website displaying an image collection, the image collection including the images.

2. The gallery of claim 1, wherein the server comprises a profile of an asset owner's account, wherein the authenticated user is directed to the profile, upon providing authentication details.

3. The gallery of claim 1, wherein the server is configured to connect a device in possession of the authenticated user to request a transfer of an asset from an account of an owner of the asset, upon decrypting the second encrypted string.

4. The gallery of claim 3, wherein the server is configured to enable the owner to impose pre-set limits on the transfer, the pre-set limits selected from the group consisting of a maximum amount per transfer and a maximum transfer frequency.

5. The gallery of claim 3, wherein the server is configured to enable the owner to preauthorize the transfer.

6. The gallery of claim 1, wherein the server is configured to connect a device in possession of the authenticated user to request transfer of an asset from an account belonging to an owner, upon decrypting the first and second encrypted strings.

7. The gallery of claim 6, wherein the server is configured to enable the owner to impose a pre-set limit on the transfer, wherein the limit is selected from the group consisting of a maximum amount per transfer and a maximum transfer frequency.

8. The gallery of claim 7, wherein the server is configured to enable the owner to require preauthorization of the transfer, when the transfer exceeds the pre-set limit.

9. The gallery of claim 1, wherein the images and QR code are displayed as physical images.

10. The gallery of claim 1, wherein the images and QR code are displayed as virtual images.

11. The gallery of claim 1, wherein the first encrypted string, when decrypted, comprises a customer identifier and QR code identifier.

* * * * *